United States Patent
Choudhary et al.

(10) Patent No.: US 10,353,929 B2
(45) Date of Patent: Jul. 16, 2019

(54) SYSTEM AND METHOD FOR COMPUTING CRITICAL DATA OF AN ENTITY USING COGNITIVE ANALYSIS OF EMERGENT DATA

(71) Applicant: Mphasis Limited, Bangalore (IN)

(72) Inventors: Divya Choudhary, Bangalore (IN); Archisman Majumdar, Bangalore (IN); Vibhav Kamath, Raigad District (IN); Udayaadithya Avadhanam, Bangalore (IN); Jai Ganesh, Bangalore (IN)

(73) Assignee: Mphasis Limited (IN)

( * ) Notice: Subject to any disclaimer, the term of this patent is extended or adjusted under 35 U.S.C. 154(b) by 256 days.

(21) Appl. No.: 15/416,476

(22) Filed: Jan. 26, 2017

(65) Prior Publication Data

US 2018/0089302 A1 Mar. 29, 2018

(30) Foreign Application Priority Data

Sep. 28, 2016 (IN) .............................. 201641033149

(51) Int. Cl.
*G06F 17/30* (2006.01)
*G06F 16/28* (2019.01)
(Continued)

(52) U.S. Cl.
CPC ............ *G06F 16/285* (2019.01); *G06F 16/27* (2019.01); *G06F 17/241* (2013.01); *G06F 17/2785* (2013.01)

(58) Field of Classification Search
CPC ...... G06F 16/285; G06F 16/27; G06F 16/241; G06F 16/2785
(Continued)

(56) References Cited

U.S. PATENT DOCUMENTS 8,566,262 B2   10/2013  Deyo
8,983,963 B2    3/2015  Fittges et al.
(Continued)

OTHER PUBLICATIONS

Chakraborty, et al., "Text Mining and Analysis—Practical Methods, Examples, and Case Studies Using SAS®." Copyright 2013, SAS Institute Inc., Cary, North Carolina, USA, Chapter 1, pp. 1-18.

*Primary Examiner* — Hares Jami
(74) *Attorney, Agent, or Firm* — Lerner, David, Littenberg, Krumholz & Mentlik, LLP

(57) ABSTRACT

System and method for computing critical data of multiple entities is provided. Elements, from a set of predetermined elements, are assigned to sentences of a first dataset associated with an entity of an industry type. Predetermined elements characterize reputation of entities of various industries. Features determined from sentences of first dataset are categorized into groups. Features of a new dataset of a different entity of said industry type are matched with grouped features and same groups are allotted thereto. Classification rules are applied on matched features. Elements are assigned to sentences of new dataset based on allotted groups, which elements are same as those assigned to first dataset. Reputation scores are generated for said entities by determining positive and negative sentiments from the first and new dataset. Steps of assigning elements and grouping are repeated for datasets associated with entities of different industry types for creating a taxonomy for them.

19 Claims, 8 Drawing Sheets

(51) Int. Cl.
*G06F 16/27* (2019.01)
*G06F 17/24* (2006.01)
*G06F 17/27* (2006.01)

(58) Field of Classification Search
USPC .......................................... 707/722, 737, 748
See application file for complete search history.

(56) References Cited

U.S. PATENT DOCUMENTS

| | | |
|---|---|---|
| 9,069,768 B1 | 6/2015 | Sampson |
| 2007/0078699 A1* | 4/2007 | Scott .................... G06Q 10/063 707/713 |
| 2007/0156665 A1 | 7/2007 | Wnek |
| 2008/0249764 A1* | 10/2008 | Huang ................ G06F 17/2785 704/9 |
| 2012/0296845 A1 | 11/2012 | Andrews et al. |
| 2017/0193581 A1* | 7/2017 | Vasthimal ......... G06F 17/30265 |

* cited by examiner

SYSTEM AND METHOD FOR COMPUTING CRITICAL DATA OF AN ENTITY USING COGNITIVE ANALYSIS OF EMERGENT DATA

FIELD OF THE INVENTION

The present invention relates generally to the field of tracking and managing data from various data sources, and in particular to a system and method to compute critical data from various data sources of entities using cognitive analysis of emergent data.

BACKGROUND OF THE INVENTION

Understanding operations of an entity and taking informed measures requires accessing and processing vast data associated with the entities. Traditionally, entities have relied on surveys or information received from focus groups for accessing such data and processing the data manually. This requires a lot of time and effort both in finding the right people, who are well aware about the entity to administer the survey and in conducting the survey/focus groups. Also, relying on survey and focus groups to collect data limits the number of entities that can be studied at a time. Further, the results from such methods may be biased as in case of moderator bias (moderator influencing the focus group participants with their own views), or by the sample set of the survey. Yet further, the results obtained by administering the survey on people who are aware of an entity 'X' cannot be extended to measure critical data of another entity 'Y'. Therefore the survey needs to be carried for each entity being studied. Furthermore, with the emergence of social media, various social media platforms are considered as an effective base for analyzing user's feedback. However, processing voluminous and complex information separately for different entities of different industries often causes wastage of time and resources and strains the infrastructure that supports the information, moreso, if an entity is within the same industry. This further leads to tedious and time consuming efforts, apart from facing issues of redundant information or omission of critical data associated with the entities. Therefore, conventional methods are, disadvantageously, highly effort intensive and require human interpretation at several stages of analysis and processing of data. To add to it, taking cognizance of real-time changes in data makes the entire process even more complicated, time-consuming, prone to loopholes and demanding increased overhead.

In light of the above drawbacks, there is a need for a system and method that provides for a holistic measure of critical data associated with entities with minimum human involvement. There is a need for a system and method that computes critical data of entities belonging to any industry efficiently and provides faster results to measure the reputation of the entities. Also, there is a need for a system and method that provides for a tool that can be reused with minimal effort for computing critical data associated with different entities with enhanced accuracy.

SUMMARY OF THE INVENTION

A method for computing critical data of the multiple entities is provided. In various embodiments of the present invention, the method is performed by a tool interfacing with multiple communications channels for retrieving data from multiple data sources associated with multiple entities. The tool executes instructions stored in a memory via a processor. The method comprises assigning, by the tool, an element, from a set of predetermined number of elements, to each sentence of a first dataset associated with an entity of an industry type. The predetermined number of elements are characteristic of reputation of entities of various industries. The method further comprises categorizing, by the tool, features determined from the sentences of the first dataset into one or more groups. Each group represents related features. Furthermore, the method comprises matching features of a new dataset of a different entity of the said industry type with the grouped features of the said industry type for allotting groups to the matched features similar to the groups of the grouped features. The method further comprises applying one or more classification rules to the matched features. The classification rules are created based on the grouped features and the assigned elements. Furthermore, the method comprises assigning, by the tool, an element to each sentence of the new dataset based on the applied classification rules. Thereby, the element assigned to each sentence of the new dataset of the different entity of the said industry type is same as the element assigned to each sentence of the first dataset of the said entity of the said industry type. Finally, the method comprises generating, by the tool, a reputation score for the said entities, wherein the reputation score is generated by determining positive and negative sentiments in the first and the new dataset. The assigning of element to the first dataset and feature grouping steps are repeated for datasets associated with entities of different industry types for creating a taxonomy for each of the different industry types.

A system for computing critical data of the multiple entities is provided. In various embodiments of the present invention, the system comprises interfacing with multiple communications channels for retrieving data from multiple data sources associated with multiple entities. The system executes instructions stored in a memory via a processor. The system comprises an inference engine in communication with the processor and configured to assign an element, from a set of predetermined elements, to each sentence of a first dataset associated with an entity of an industry type. The predetermined elements are characteristic of reputation of entities of various industries. The inference engine categorizes features determined from the sentences of the first dataset into one or more groups. Each group represents related features. Further, the inference engine matches features of a new dataset of a different entity of the said industry type with the grouped features of the said industry type to allot groups to the matched features similar to the groups of the grouped features. Furthermore, the inference engine applies one or more classification rules to the matched features. The classification rules are created based on the grouped features and the assigned elements. The inference engine assigns an element to each sentence of the new dataset based on the applied classification rules. Thereby, the element assigned to each sentence of the new dataset of the different entity of the said industry type is same as the element assigned to each sentence of the first dataset of the said entity of the said industry type. Finally, the inference engine generates a reputation score for the said entities. The reputation score is generated by determining positive and negative sentiments in the first and the new dataset. The assigning of element to the first dataset and the feature grouping steps are repeated for datasets associated with entities of different industry types for creating a taxonomy for each of the different industry types.

A computer program product is provided. The computer program product comprises a non-transitory computer-readable medium having computer-readable program code stored thereon, the computer-readable program code comprising instructions that, when executed by a processor, cause the processor to: assign an element to each sentence of a first dataset fetched from a data storage. The sentences are associated with an entity of an industry type. The element is assigned to each sentence from a set of predetermined elements. The predetermined elements are characteristic of reputation of entities of various industries. Further, features of the first dataset are categorized into one or more groups. Each group represents related features. Furthermore, the features of the new dataset of a different entity of the said industry type are matched with the grouped features of the said industry type to allot groups to the matched features similar to the groups of the grouped features. Further, one or more classification rules are applied on the new dataset to the matched features. The one or more classification rules are created based on the assigned elements and the grouped features. Further, metadata representing instructions for assigning an element to each sentence of the new dataset of the different entity of the said industry type based on the grouping of the matched features is generated. Based on the metadata, an element is assigned to each sentence of the new dataset. The element assigned to each sentence of the new dataset of the different entity of the said industry type is same as the element assigned to each sentence of the first dataset of the said entity of the said industry type. Furthermore, the elements assigned to the first dataset and the new dataset are assigned to identify a sentiment associated with the said entities of the said industry type. The sentiment is identified by determining sentences from the first and the new dataset as representing a positive sentiment or a negative sentiment. Furthermore, a reputation score is generated for the said entities based on the identified sentiments. The steps of assigning and grouping features are repeated for datasets associated with entities of different industry types for creating a taxonomy for each of the different industry types.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for computing critical data of entities using cognitive analysis of emergent data is provided. The invention provides for a tool that is capable of computing critical data of all entities in a given industry, simultaneously, using cognitive analysis and machine learning techniques. The tool is capable of quantifying and contextualizing data obtained from multiple data sources for all entities in a given industry and computing critical data for measuring reputation of the entities.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
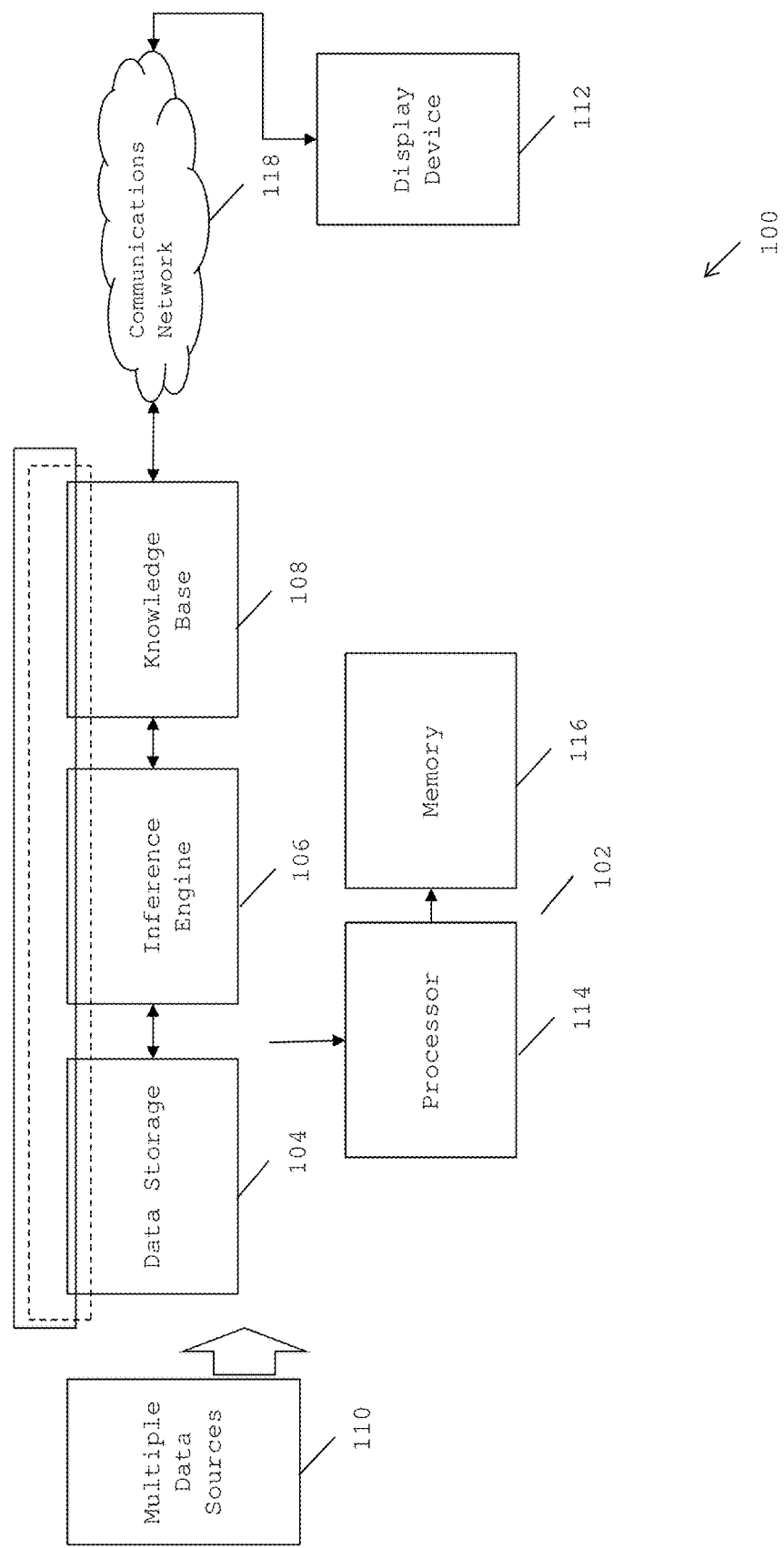
FIG. 1 illustrates a block diagram of a system for computing critical data of entities using cognitive analysis of emergent data, in accordance with various embodiments of the present invention.

FIG. 1 illustrates a block diagram of a system 102 for computing critical data of entities using cognitive analysis of emergent data, in accordance with various embodiments of the present invention. The system 102 is a tool that interfaces with multiple communications channels to retrieve data from multiple data sources 110 associated with all the entities. The entities may pertain to various industries (e.g: banking, logistics, retail, catering etc.), and data related to the entities may include, but is not limited to, social media data, service center record data, government data, data from various blogs, and data from news and editorial articles.

In an embodiment of the present invention, the system 102 comprises a data storage 104 for storing the data received from the multiple data sources 110. The data includes, but is not limited to, structured data, unstructured data, temporal data, and multi-media datasets obtained from the multiple data sources 110. The data storage 104 is configured to monitor the multiple data sources 110 at predetermined intervals of time to update the data with real-time information (emergent data). The system 102 further comprises an inference engine 106 configured to fetch and compute the data stored in the data storage 104 in accordance with various embodiments of the present invention. The inference engine 106 comprises one or more units that operate in tandem to quantify data obtained from the data storage 104, and generate industry contextualized taxonomy which can be reused for any entity in the same industry. The system 102 further comprises a knowledge base 108 for receiving and storing processed data from the inference engine 106. The knowledge base 108 may be accessed by users of the system 102 for displaying content in various formats, including graphical formats, via a display device 112. The displayed content provides information on reputation of the concerned entity. Examples of display device 112 may include, but is not limited to, a personal computer, a laptop and any other wired or wireless terminal. The various components of the system 102 are operated via a processor 114 specifically programmed to execute instructions stored in a memory 116 for executing respective functionalities of the system 102 components (104-108), in accordance with various embodiments of the present invention.

In an embodiment of the present invention, the system 102 may be implemented in a cloud computing architecture in which data, applications, services, and other resources are stored and delivered through shared data-centers. In an exemplary embodiment of the present invention, the functionalities of the tool are delivered to the users as software as a service (SAAS) over a communications network 118. In another embodiment of the present invention, the system 102 may be implemented as a client-server architecture with the client terminals (display devices 112) accessing a server hosting the system 102 over a communications network 118. The client terminals may include a personal computer, a laptop and any other wired or wireless terminal. The communications network 118 may include a Local Area Network (LAN), a Metropolitan Area Network (MAN), a Wide Area Network (WAN), or any other type of wired or wireless network. In accordance with various embodiments of the present invention, the system 102 (tool) provides a ubiquitous and integrated platform for all the entities in a given industry for users to garner knowhow of reputation of the entities and track such reputation over a period of time.

Figure 2:
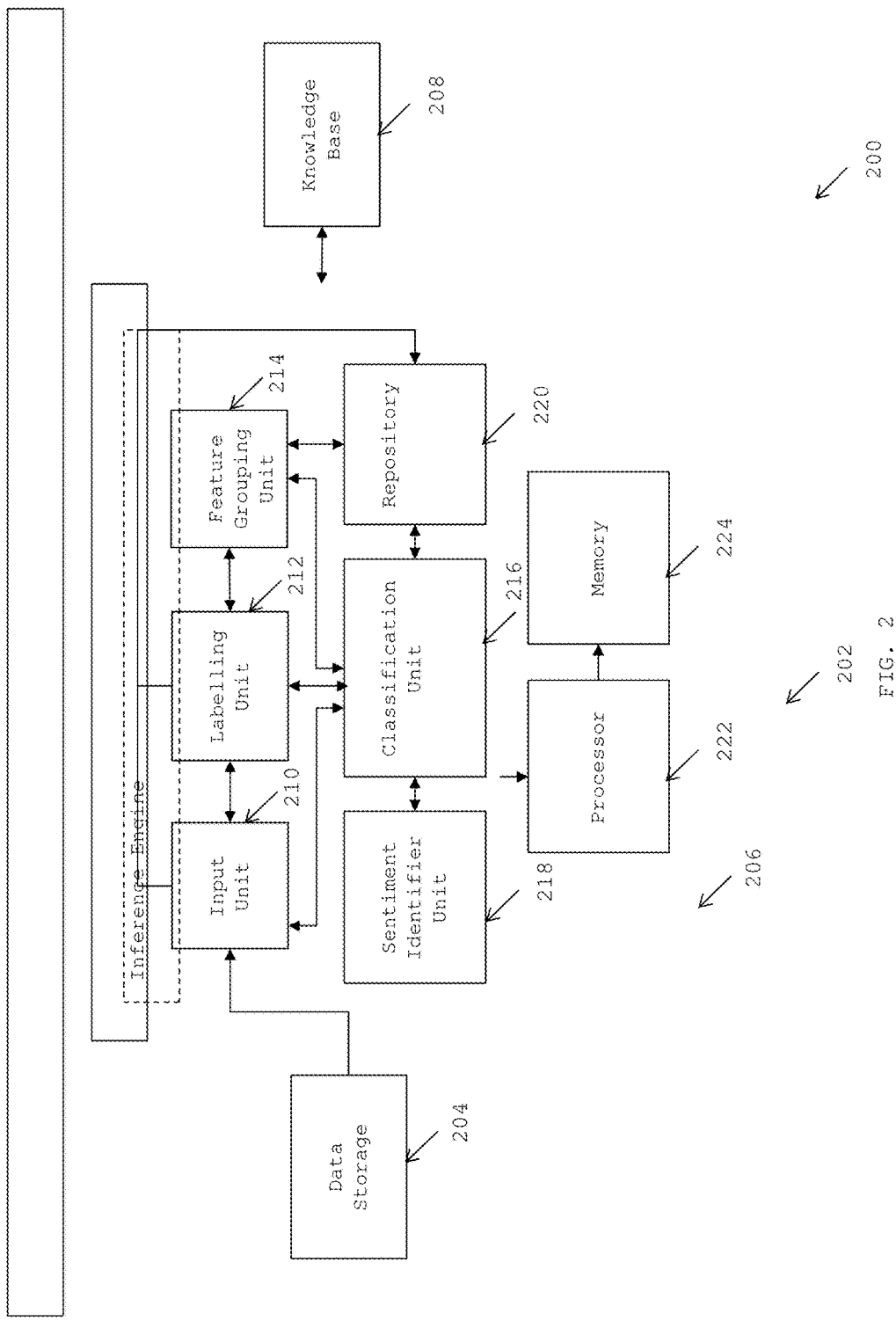
FIG. 2 is a detailed block diagram of the system for computing critical data of entities using cognitive analysis of emergent data, in accordance with various embodiments of the present invention.

FIG. 2 is a detailed block diagram of the system 202 for computing critical data of entities using cognitive analysis of emergent data, in accordance with various embodiments of the present invention. The system 202 comprises a data storage 204, an inference engine 206 and a knowledge base 208. The inference engine 206 further comprises an input unit 210, a labelling unit 212, a feature grouping unit 214, a classification unit 216, a sentiment identifier unit 218, and a repository 220. The inference engine 206 is a self-learning engine configured to automatically analyze complex data, extract content and group the content based on related features. For each entity, the inference engine 206 then creates contextualized industry specific taxonomy and stores the same in the repository 220. Based on the industry specific taxonomy, the inference engine 206 creates classification rules such that each time the inference engine 206 analyzes a new set of data for other entities in the same industry, the classification rules are applied on the new set of data for computing critical data of that particular entity. The inference engine 206 operates in conjunction with a processor 222 that is specifically programmed to execute functionalities of the various units (210-220) of the inference unit 206 using program instructions stored in the memory 224.

In an embodiment of the present invention, the input unit 210 of the inference engine 206 fetches data (first dataset) from the data storage 204. In the data storage 204, data collected from multiple data sources (110, FIG. 1) are sorted and categorized for each entity. As discussed in conjunction with FIG. 1, the data includes, but is not limited to, data collected from social media (e.g. tweets about an entity, facebook page of the entity etc.), government data, news and editorial articles, blogs and consumer complaints related to the entities. The data categorized for each entity is indexed such that relevant data for each entity can be searched and retrieved by the input unit 210. In an exemplary embodiment of the present invention, a new field is added to each data. The field specifies the entity name, so that when required later, the data can be fetched for any entity by entering entity name. The data storage 204 is updated with real-time data associated with the various entities at predetermined intervals of time. The data includes, but is not limited to, structured sentences, unstructured sentences, temporal data, and multi-media datasets corresponding to various entities of various industries such as banking, financial services and insurance, logistics, e-commerce, retail, Fast Moving Consumer Goods (FMCG), manufacturing, construction etc. The input unit 210 provides an interface to an end-user seeking to create reputation information of entities for each industry. Subsequent to receiving a command from the end-user, the input unit 210 searches data relevant to the desired entity in the data storage 204. The input unit 210 thereafter retrieves relevant data from the indexed content corresponding to the desired entity from the data storage 214. The input unit 210 then invokes the labelling unit 212 to process the retrieved data.

In an embodiment of the present invention, the labelling unit 212 in the inference engine 206 is pre-configured with elements (dimensions representative of reputation of an entity) which are characteristic of reputation of entities of various industries. In an exemplary embodiment of the present invention, the elements may include, but is not limited to, service or product quality label, social responsibility label, employee friendliness label, technology advancement label, and financial condition label. The labelling unit 212 processes the received data using cognitive analysis to assign an appropriate label to each data. In an exemplary embodiment of the present invention, the labelling unit 212 uses pre-existing dataset associated with entities of different industry types that is collected over a period of time to develop cognitive analysis, using which the labelling unit 212 assigns an appropriate label to each received data. The labelling unit 212 updates the pre-existing dataset for assigning appropriate label to future unlabeled data.

An exemplary illustration of labels assigned to data assigned to an entity from the Banking, financial and Insurance (BFSI) industry is provided herein under:

| Sentence | Service or product quality Label | Social Responsibility and ethics Label | Technology Advancement Label | Employee friendliness Label | Financial Condition Label |
|---|---|---|---|---|---|
| @xxxBank thanks for taking care of my simple | ✓ | | | | |

-continued

| Sentence | Service or product quality Label | Social Responsibility and ethics Label | Technology Advancement Label | Employee friendliness Label | Financial Condition Label |
|---|---|---|---|---|---|
| request! It was much appreciated. | | | | | |
| xxxBank worst customer support ever. Can't believe how long I've been on hold. 1 hour and counting. Unbelievable | ✓ | | | | |
| Really disappointed in xxxBank called into customer service with an issue and was turned away, my first time calling for assistance. | ✓ | | | | |
| xxxBank fined $700m for deceptive marketing | | ✓ | | | |
| I just checked in at xxxBank with mobilebankingapp. Download #mPLUSPlaces today! | | | ✓ | | |
| xxxBank what's wrong with your website. Crashes on Sunday morning! | | | ✓ | | |
| How does a multimillion dollar bank refuse to use an email system? They still ask for fax | | | ✓ | | |
| xxxBank named top FinTech provider of year 2015. That's my Bank | | | ✓ | | |
| 1st day on job at xxxBank, and I already love it. | | | | ✓ | |
| xxxBank Q3 results disappointing | | | | | ✓ |
| xxxBank hits 22 month low post Quarter3 | | | | | ✓ |

| Sentence | Service or product quality Label | Social Responsibility and ethics Label | Technology Advancement Label | Employee friendliness Label | Financial Condition Label |
|---|---|---|---|---|---|
| Results. Stock dipped 7% | | | | | |
| . . . | | | | | |

In an embodiment of the present invention, the feature grouping unit 214 in the inference engine 206 analyzes the labelled data to remove certain features or augment certain other features to make these features easily classifiable. In an exemplary embodiment of the present invention, the feature grouping unit 214, converts the labelled data to a single case (upper or lower) and cleans the labelled data to remove the likes of numbers (0-9), entity names used to download data, symbols and characters not belonging to the language under consideration (â, ŏ, ñ, î), commonly occurring words in a language (such as: for, it, an, the, etc. in the English language). All these characters or words or symbols to be removed may be pre-defined in a dictionary (not shown), which can be manually updated with new characters or words or symbols.

The feature grouping unit 214 thereafter forms groups representing related content. These groups when seen in entirety represent the reputation related features of the said industry. In an exemplary embodiment of the present invention, supervised machine learning techniques may be used to remove features, augment features and generate various groups representing related content.

An exemplary illustration of various groups that are generated representing service or quality element, technology advancement element, social responsibility and ethics element, employee friendliness and financial condition elements of the BFSI industry is provided herein under:

Feature Groups Representing Service Aspect for the BFSI Industry

| Group | Features |
|---|---|
| 1 | customer |
|   | support |
|   | service |
|   | call |
| 2 | Institute |
|   | Insurance |
|   | Insurer |
|   | Officer |
|   | Premium |
|   | Merchant |
|   | Manager |
| 3 | Account |
|   | Banker |
|   | amount |
|   | benefits |
|   | billion |
|   | branches |
|   | brokerage |
|   | brokers |
|   | capital |
|   | debit |
|   | debt |
|   | deposits |
|   | executive |
|   | federal |

-continued

| Group | Features |
|---|---|
|   | finances |
|   | fraud |
|   | holiday |
|   | homeownership |
|   | investment |
|   | investor |
|   | payments |
|   | realestate |
| 4 | robbery |
|   | Police |
|   | suspect |
|   | floor |
|   | awful |
|   | point |
|   | raised |
|   | slashes |
|   | technical |

Feature Groups Representing Technology Advancement Aspect for the BFSI Industry

| Group | Features |
|---|---|
| 1 | Email |
|   | Slow |
|   | fax |
| 2 | Website |
|   | Crash |
|   | App |
|   | Checkin |
| 3 | Cyberattack |
|   | Database |
|   | Hack |
|   | Security |
| 4 | Fintech |
|   | Automation |
|   | Robo-advisor |

Feature Groups Representing Social Responsibility and Ethics Aspect for the BFSI Industry

| Group | Features |
|---|---|
| 1 | CSR |
|   | Activity |
|   | Awareness |
| 2 | Deceptive |
|   | Advertising |
|   | Marketing |
|   | false |

Feature Groups Representing Employee Friendliness Aspect for the BFSI Industry

| Group | Features |
| --- | --- |
| 1 | Job |
|  | Satisfaction |
|  | Day |
|  | Years |
|  | HR |
|  | policy |
| 2 | Diversity |
|  | Disabled |
|  | friendly |
|  | Employee |

Feature Groups Representing Financial Condition Aspect for the BFSI Industry

| Group | Features |
| --- | --- |
| 1 | Quarter |
|  | Results |
|  | Fiscal |
|  | Performance |
| 2 | market |
|  | Stocks |
|  | Rise |
|  | Dip |
|  | Buy |
|  | Sell |
|  | shares |
| 3 | Bankruptcy |
|  | recession |
|  | assets |
|  | NPA |

The labelling unit 212 and the feature grouping unit 214 repeat its functionalities for different industry types as the essentials of different elements may differ for different industries. For instance, service quality element typically has a different meaning for BFSI industry and logistics industry. The labelling unit 212 and the feature grouping unit 214 thereby creates contextualized industry specific taxonomies. The results of the feature grouping unit 214 are stored in the repository 220.

In an embodiment of the present invention, the processes executed by the labelling unit 212 and the feature grouping unit 214 are received by the classification unit 216. The classification unit 216 creates one or more classification rules for the attributes employed for labelling and feature grouping for each industry type.

In an embodiment of the present invention, the one or more classification rules are stored in the classification unit 216 and are applied on future (new dataset) data associated with other entities (i.e. unlabeled data) of a given industry type. The one or more classification rules are applied on the new dataset such that the features of the new dataset (unlabeled data) are matched with features in groups created from labelled data that are stored in the repository 220. The matched features are then allotted to the same groups of the said industry. Accordingly, for various industry types, the inference engine 206 creates contextualized industry taxonomy, which is stored in the repository 220. Advantageously, the inference engine 206 is a self-learning system as new features are constantly added to the groups, and the groups keep getting enhanced.

The following is an illustrative representation of contextualized industry taxonomy for different industries

| BFSI | E commerce | FMCG |
| --- | --- | --- |
| Loan | On time delivery | Fresh Products |
| Customer Churn | Exclusive sale | Beauty products |
| Credit card | Easy returns | Edibles |
| Payment failure | New Applications |  |
| Website crash | Company Evaluation |  |

Figure 2A:
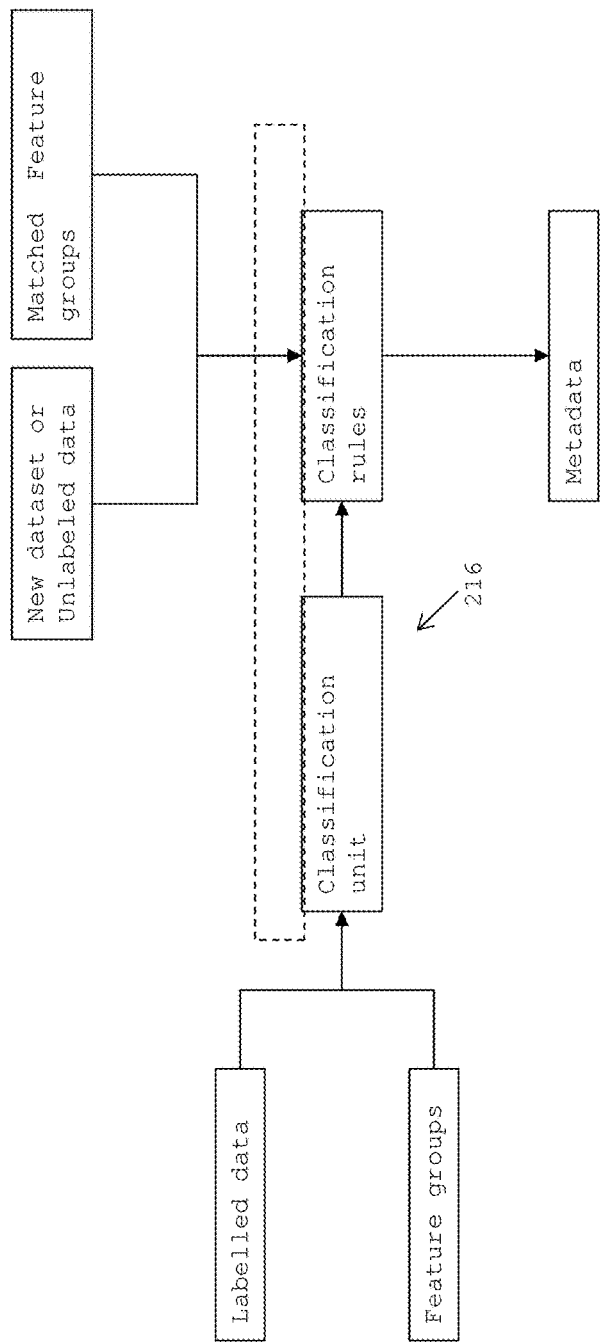
FIG. 2A represents an illustrative process flow of the classification unit, in accordance with various embodiments of the present invention.

In operation, in various embodiments of the present invention, when a new dataset is retrieved by the input unit 210, the new dataset is processed by removing certain features or augmenting certain other features so that the dataset can be easily manipulated. Thereafter, the input unit 210 sends the processed data to the classification unit 216 which performs a matching operation on the new dataset using grouped features stored in the repository 220. The classification unit 216 then applies the stored classification rules on the results of the matching operation (matched data) and generates metadata representing instructions for labelling the new dataset. The classification unit 216 then sends the metadata obtained from processing the new dataset, to the labelling unit 212. The labelling unit 212 processes the received data and assigns an appropriate label to each dataset based on the metadata. The results of labeling are similar to labelling of data of other entities in the same industry. In accordance with various embodiments of the present invention, each time a new dataset of a new entity belonging to the same industry is received, the new dataset is subjected to the process mentioned above, and are classified as referring to a particular element (dimension) of reputation based on the stored groups of features and the classification rules for a given industry type. FIG. 2A represents an illustrative process flow of the classification unit 216, in accordance with various embodiments of the present invention.

In an embodiment of the present invention, after the labelling process, the first dataset and the new dataset associated with the said entities is sent to a sentiment identifier unit 218 to analyze and identify the sentiment as positive or negative for a given element (dimension) of the industry. The sentiment identifier unit 218 is further configured to generate a reputation score for the desired entity of a given industry. In an exemplary embodiment of the present invention, the reputation score may be measured in the following illustrative manner:

The sentiment identifier unit 218 identifies sentences in the data (and new dataset) text as positive or negative. In an exemplary embodiment of the present invention, the sentiment identifier unit 218 operates by parsing data into parts of speech and matches the words with a pre-existing dictionary of words (not shown) already classified as positive, negative or neutral, and the strength of positivity and negativity. The sentence structure is analyzed to take into account of words like not, very etc. that change or strengthen the meaning of the word immediately succeeding it.

| Sentence | Service or product quality Label | Social Responsibility and ethics Label | Technology Advancement Label | Employee friendliness Label | Financial Condition Label |
| --- | --- | --- | --- | --- | --- |
| S1 | Positive |  |  |  |  |
| S2 | Negative |  |  |  |  |

-continued

| Sentence | Service or product quality Label | Social Responsibility and ethics Label | Technology Advancement Label | Employee friendliness Label | Financial Condition Label |
|---|---|---|---|---|---|
| S3 | | Positive | | | |
| S4 | | | Negative | | |
| S5 | | | | Positive | |
| S6 | | | | | Negative |
| S7 | | | | Negative | |
| ... | | | | | |

After identifying the sentences with reputation elements (dimensions) and sentiments, the reputation score is measured by computing what percentage of those sentences identified as a dimension are positive or negative.

For Example:

If, out of 100 data points, the distribution of the 5 above mentioned dimensions is as follows:

| Dimension | Number of sentences |
|---|---|
| Service or product quality | 40 |
| Social Responsibility and ethics | 10 |
| Technology Advancement | 20 |
| Employee friendliness | 20 |
| Financial Condition | 10 |

And, the Sentiment in those sentences is as follows:

| Dimension | Number of sentences in each dimension | Number of Sentences with Positive Sentiment | Number of Sentences with Negative Sentiment |
|---|---|---|---|
| Service or product quality | 40 | 30 | 10 |
| Social Responsibility and ethics | 10 | 6 | 4 |
| Technology Advancement | 20 | 12 | 8 |
| Employee friendliness | 20 | 18 | 2 |
| Financial Condition | 10 | 2 | 8 |

Then the reputation score is as follows:

| Dimension | Number of sentences | Positive | Negative | Reputation Score |
|---|---|---|---|---|
| Service or product quality | 40 | 30 | 10 | 75% |
| Social Responsibility and ethics | 10 | 6 | 4 | 60% |
| Technology Advancement | 20 | 12 | 8 | 60% |
| Employee friendliness | 20 | 18 | 2 | 90% |
| Financial Condition | 10 | 2 | 8 | 20% |

In another exemplary embodiment of the present invention, at the end of analysis a reputation score ranging from −1 to +1 is generated for each sentence. Scores less than −0.2 denote overall negative sentiment of the sentence. Scores greater than 0.2 denote overall positive sentiment of the sentence, and scores between −0.2 to 0.2 denote overall neutral sentiment in the sentence.

In an exemplary embodiment of the present invention, the sentiment identifier unit 218 may represent the sentiments corresponding to a given element (dimension) of the industry by way of a graphical representation demonstrating percentage of positive sentiments versus negative sentiments. In another exemplary embodiment of the present invention, the sentiment identifier unit 218 may generate a trending graph representative of reputation score corresponding to a given element (dimension) of the industry.

Figure 2B:
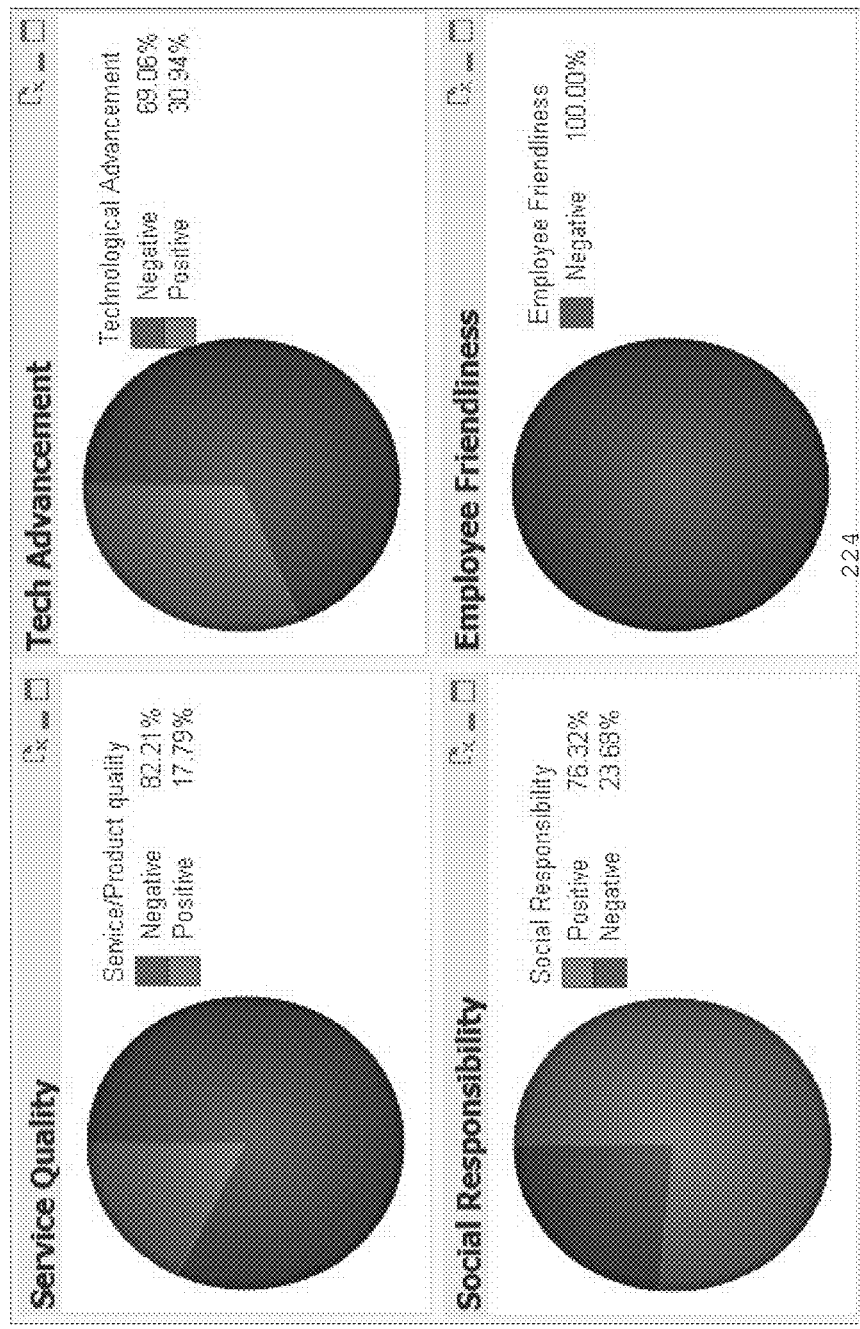
FIG. 2B is an exemplary screen shot illustrating a graphical representation of sentiments for an entity of a given industry which is indicative of the reputation of the entity.
Figure 2C:
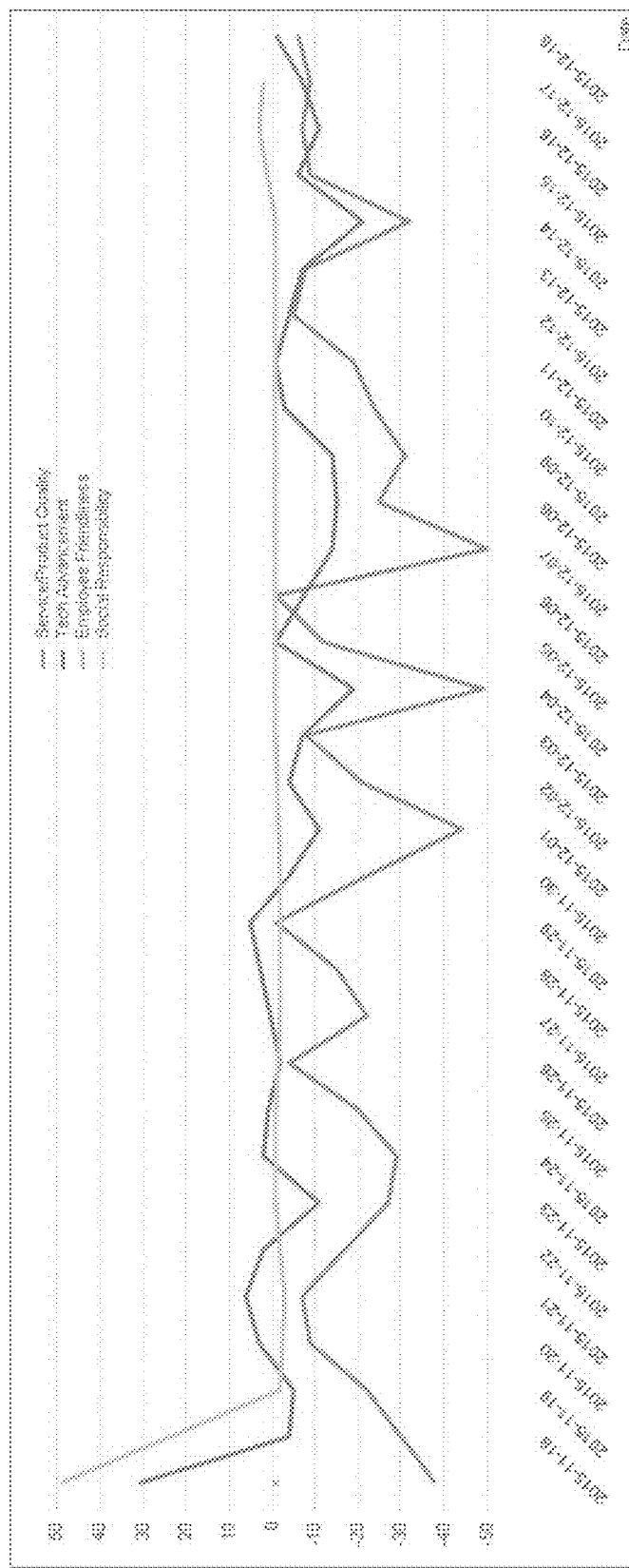
FIG. 2C is another exemplary screen shot illustrating a trending graph representing reputation scores for an entity of a given industry which is indicative of the reputation of the entity.

In an embodiment of the present invention, the data from the sentiment identifier unit 218 is stored in the knowledge base 208. The knowledge base 208 may be accessed via a display device (not shown) by a user seeking to view reputation score of a particular entity. FIG. 2A is an exemplary screen shot illustrating a graphical representation of sentiments for an entity of a given industry which is indicative of the reputation of the entity. FIG. 2B is another exemplary screen shot illustrating a trending graph representing sentiments for an entity of a given industry which is indicative of the reputation of the entity.

Figure 3A:
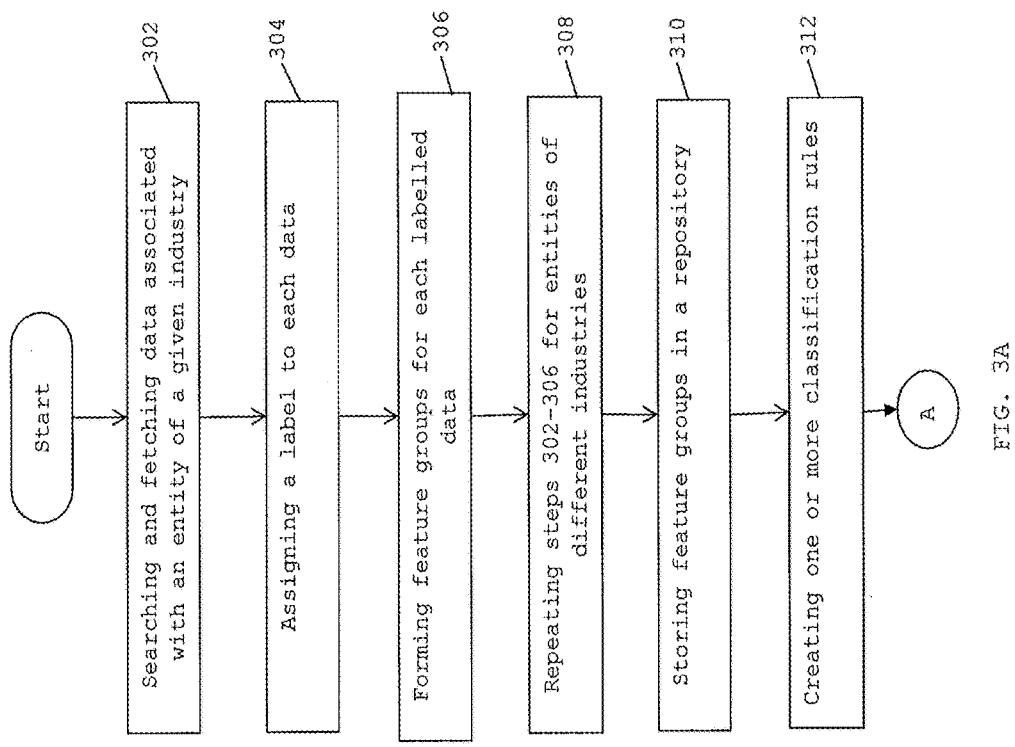
FIGS. 3A and 3B show a flowchart illustrating a method of computing critical data of entities using cognitive analysis of emergent data, in accordance with various embodiments of the present invention.
Figure 3B:
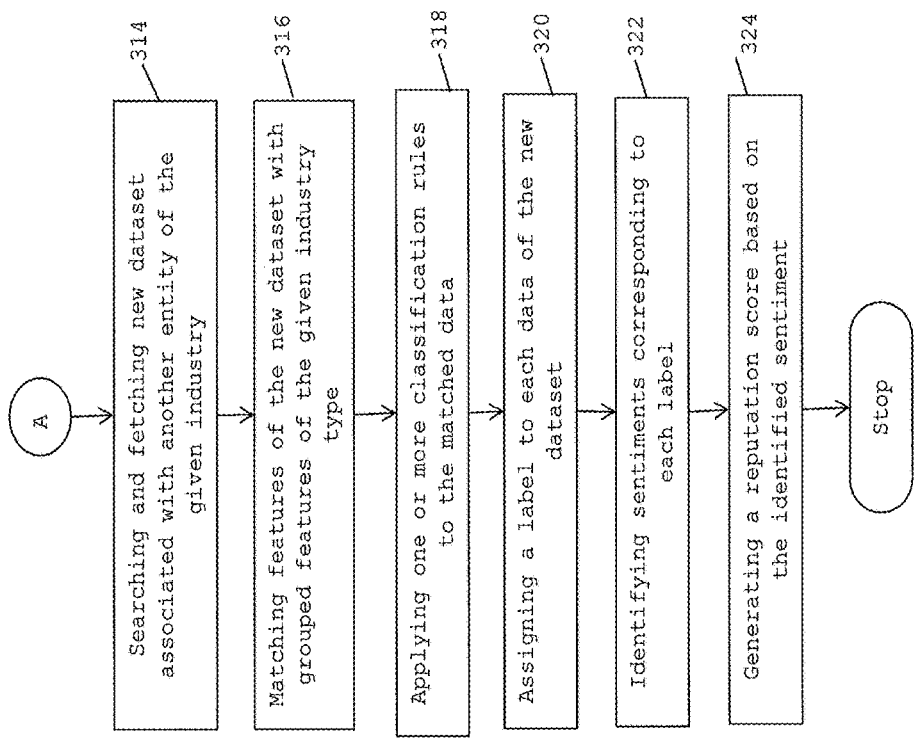

FIGS. 3A and 3B show a flowchart illustrating a method of computing critical data of entities using cognitive analysis of emergent data, in accordance with various embodiments of the present invention.

At step 302, data corresponding to a particular entity of a given industry is searched and fetched from a data storage. In an embodiment of the present invention, in the data storage, data collected (first dataset) from multiple data sources are sorted and categorized for each entity. As discussed in conjunction with FIG. 1, the data includes, but is not limited to, data collected from social media (e.g. tweets about an entity, facebook page of the entity etc.), news and editorial articles, blogs and consumer complaints related to the entities. The data storage is updated with real-time information at pre-determined intervals of time. The data includes, but is not limited to, structured data, unstructured data, temporal data, and multi-media datasets corresponding to each entity of various industries such as banking, financial services and insurance, logistics, e-commerce, retail, Fast Moving Consumer Goods (FMCG), manufacturing, construction etc. The data categorized for each entity is indexed such that relevant data for each entity can be searched and retrieved. Subsequent to receiving a command from the end-user, data relevant to the desired entity is searched in the data storage. Thereafter relevant data is retrieved from the indexed content corresponding to the desired entity from the data storage.

At step 304, the retrieved data is processed to assign an appropriate label to each data. In an embodiment of the present invention, elements (dimensions) which are characteristic of reputation of entities of various industries are pre-configured. In an exemplary embodiment of the present invention, the elements may include, but is not limited to, service or product quality label, social responsibility label, employee friendliness label, technology advancement label, and financial condition label. The received data is processed using cognitive analysis and an appropriate label is assigned to each data.

At step 306, the labelled data is analyzed to form groups of features representing related content for each element (dimension). In an embodiment of the present invention, the labelled data is, firstly, analyzed to remove certain features or augment certain other features to make these features easily classifiable. Thereafter, groups of features representing related content for each element dimension) are formed. These groups when seen in entirety represent the reputation related features of the said industry. In an exemplary embodiment of the present invention, supervised machine learning techniques may be used to remove features, augment features and generate various groups representing related content.

At step 308, steps 302 to 306 are repeated for each industry type and industry specific taxonomy is created. In an embodiment of the present invention, the labelling and feature grouping process is repeated for various industry types. This is necessary, as the essentials of different elements (dimensions) may differ for different industries. For instance, service quality element typically has a different meaning for BFSI industry and logistics industry. For example, service for BFSI may mean customer support, while for logistics it may mean "on time delivery". In the process, industry specific taxonomy is created for each industry type.

At step 310, results of the feature grouping are stored in a repository for each industry type.

At step 312, one or more classification rules are created. In an embodiment of the present invention, the one or more classification rules are created based on the analysis of the attributes used in the labelling and feature grouping process. In an exemplary embodiment of the present invention, the classification rules may include a rule that ascertains that if a new dataset have features belonging to group 1 and features belonging to group 2, then the features have a x % chance of being labelled as the element service or product quality label. Further, the classification rules may include a rule that ascertains that if the new dataset have features belonging to group 1 and features belonging to group 3, then the features have a y % chance of being labelled as the element technology advancement label. Furthermore, the classification rules may include a rule that ascertains that if the new dataset have features belonging to group 1 and features belonging to group 4, then the features have a z % chance of being labelled as the element employee friendliness.

At step 314, a new dataset corresponding to a different entity of a given industry is searched and fetched from the data storage. In an embodiment of the present invention, subsequent to receiving a command from the end-user, the new data relevant to the other entity is searched in the data storage. Thereafter relevant data is retrieved from the indexed content corresponding to the other entity from the data storage.

At step 316, features of the new dataset are matched with the grouped features of the said industry type. In an embodiment of the present invention, the matching is performed for allotting groups to the matched features similar to the groups of the grouped features. That is, the matched features are allotted to the same groups of the said industry.

At step 318, the one or more classification rules are applied to the matched data. In an embodiment of the present invention, the one or more classification rules are applied to the matched features to generate a metadata representing instructions for labelling the sentences of the new dataset.

At step 320, an appropriate label is assigned to the new dataset corresponding to each element (dimension) of the given industry. In an embodiment of the present invention, the results of labeling are similar to labelling of data of other entities in the same industry. In accordance with various embodiments of the present invention, each time a new dataset of a new entity belonging to the same industry is received, the new dataset is subjected to the process mentioned above, and are labelled as referring to a particular element (dimension) of reputation based on the stored groups of features and the classification rules for a given industry type.

At step 322, the labelled data is analyzed to identify sentiments associated with the data as well as the new dataset. In an embodiment of the present invention, after the labelling process, the new dataset associated with the other entity of the given industry type is analyzed and sentiments are identified as positive or negative for a given element (dimension) of the industry. In various embodiments of the present invention, cognitive analysis and machine learning techniques are used for sentiment identification of entities of a given industry. In various embodiments of the present invention, the sentiments may be identified in the manner as discussed in conjunction with FIG. 2.

At step 324, a reputation score is generated corresponding to each element for the entities of a given industry. An exemplary manner of generating reputation score is described in conjunction with FIG. 2. In an exemplary embodiment of the present invention, based on the reputation score, the sentiments corresponding to a given element (dimension) of the industry may be represented by way of a graphical representation demonstrating percentage of positive sentiments versus negative sentiments. In another exemplary embodiment of the present invention, based on the reputation score, the reputation score may be represented in the form of a trending graph corresponding to a given element (dimension) of the industry. The various representations of the sentiments are indicative of the reputation of the desired entities.

Advantageously, accuracy and precision of labelling critical data of entities for ascertaining reputation of the entities increases dramatically by implementing the various embodiments of the present invention. A comparison of increased accuracy and precision of labelling using the present invention in machine learning models such as Support Vector Machines (SVM), Random Forest and Naïve Bayes over conventional methods is provided herein below.

|  | SVM | Random Forest | Naïve Bayes |
|---|---|---|---|
| Using conventional methods | | | |
| Accuracy (% of correct predictions) | 86.24 | 77.01 | 13.76 |
| Precision (% times the predictions of TRUE are correct) | 0 | 6.34 | 13.76 |
| Recall (How many of the TRUE did I capture?) | 0 | 4.87 | 1 |
| Using the present invention | | | |
| Accuracy (% of correct predictions) | 88.25 | 88.92 | 15.93 |
| Precision (% times the predictions of TRUE are correct) | 61.54 | 58.51 | 13.69 |
| Recall (How many of the TRUE did I capture?) | 39.02 | 67.07 | 96.34 |

Figure 4:
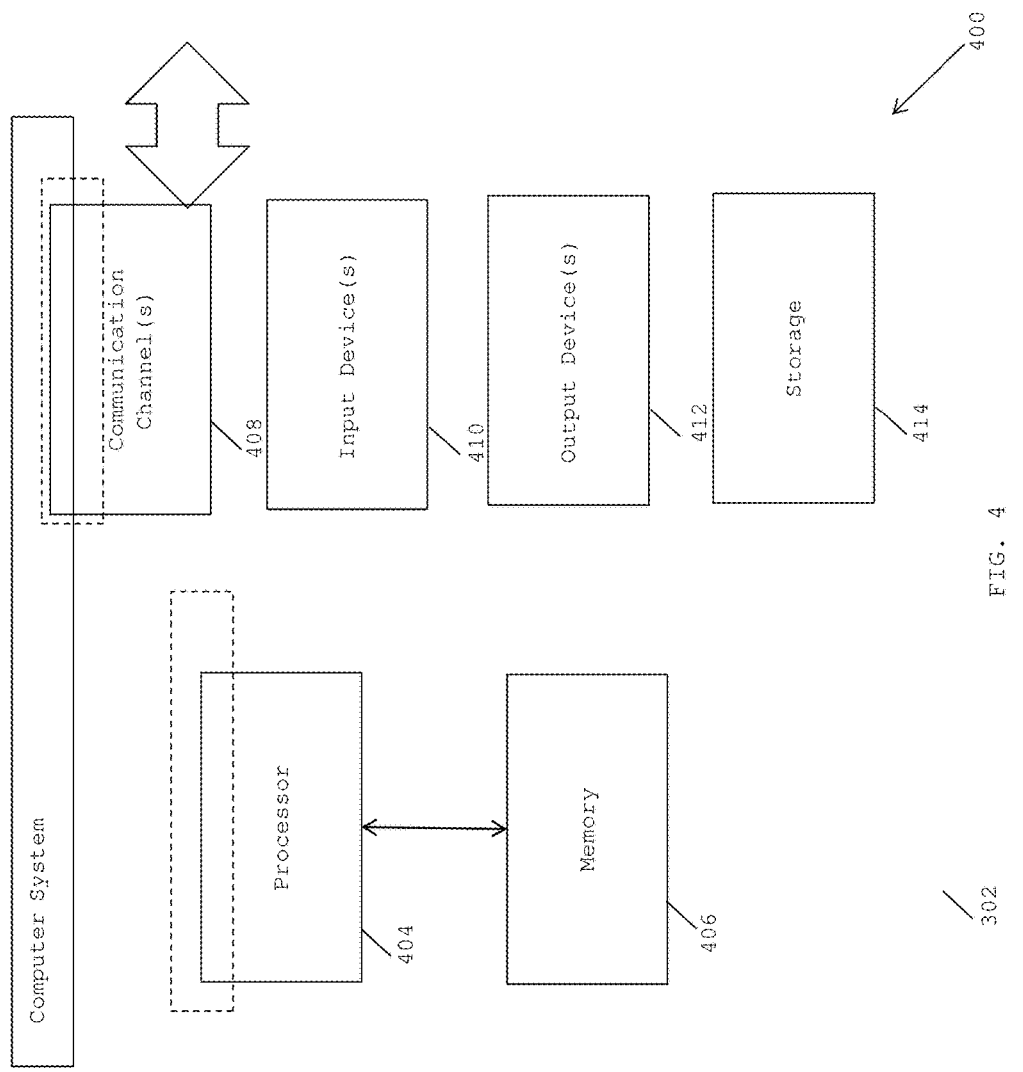
FIG. 4 illustrates an exemplary computer system in which various embodiments of the present invention may be implemented.

FIG. 4 illustrates an exemplary computer system in which various embodiments of the present invention may be implemented.

The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 302.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method, performed by a tool interfacing with multiple communications channels for retrieving data from multiple data sources associated with multiple entities, for computing critical data of the multiple entities, the tool executing instructions stored in a memory via a processor, the method comprising:

assigning, by the tool, an element, from a set of predetermined number of elements, to each sentence of a first dataset associated with an entity of an industry type, the predetermined number of elements being characteristic of reputation of entities of various industries, wherein the element is assigned to each sentence of the first dataset based on cognitive analysis capability developed by the tool using pre-existing dataset associated with entities of different industry types collected over a period of time;

categorizing, by the tool, features determined from the sentences of the first dataset into one or more groups, wherein each group represents related Features, corresponding to each assigned element;

matching features of a new dataset of a different entity of the said industry type with the grouped features of the said industry type for allotting groups to the matched Features similar to the groups of the grouped features;

applying one or more classification rules to the matched features, to generate metadata representing instructions for assigning an element to each sentence of the new dataset, the classification rules being created based on the grouped features and the assigned elements;

assigning, by the tool, the element to each sentence of the new dataset based on the applied classification rules, thereby the element assigned to each sentence of the new dataset of the different entity of the said industry type is similar to the element assigned to each sentence of the first dataset of the said entity of the said industry type; and generating, by the tool, a reputation score for the said entities, wherein the reputation score is generated by determining positive and negative sentiments in the first and the new dataset, wherein the assigning of element to the first dataset and feature grouping steps are repeated for datasets associated with entities of different industry types for creating a taxonomy for each of the different industry types, and wherein the pre-existing data in the tool is updated with content of the first dataset and the new dataset.

2. The method of claim 1, further comprising: identifying, by the tool, a sentiment associated with the said entities of the said industry type, wherein the sentiment is identified by determining sentences from the first and the new dataset as representing a positive sentiment and a negative sentiment by matching words in the sentences with words stored in a dictionary identified as positive or negative; and generating the reputation score by computing a percentage of sentences in the first and the new dataset representing a positive and a negative sentiment.

3. The method of claim 1, wherein the set of predetermined elements are pre-configured in the tool.

4. The method of claim 1, wherein the elements comprise at least one member selected from the group comprising of: service or product quality label, social responsibility label, employee friendliness label, technology advancement label, and financial condition label.

5. The method of claim 1, further comprising storing the grouped features in a repository, thereby creating a taxonomy for the different industry types.

6. A system, interfacing with multiple communications channels for retrieving data from multiple data sources associated with multiple entities, for computing critical data of the multiple entities, the system executing instructions stored in a memory via a processor, the system comprising:

an inference engine, executed by one or more processors, in communication with the processor and configured to:

assign an element, from a set of predetermined elements, to each sentence of a first dataset associated with an entity of an industry type, the predetermined elements being characteristic of reputation of entities of various industries;

categorize features determined from the sentences of the first dataset into one or more groups, wherein each group represents related features corresponding to each assigned element;

match features of a new dataset of a different entity of the said industry type with the grouped features of the said industry type for allotting groups to the matched features similar to the groups of the grouped features;

apply one or more classification rules to the matched features to generate metadata representing instructions for assigning an element to each sentence of the new dataset, the classification rules being created based on the grouped features and the assigned elements;

assign the element to each sentence of the new dataset based on the applied classification rules, thereby the element assigned to each sentence of the new dataset of the different entity of the said industry type is same as the element assigned to each sentence of the first dataset of the said entity of the said industry type; and generate a reputation score for the said entities, wherein the reputation score is generated by determining positive and negative sentiments in the first and the new dataset, wherein the assigning of element to the first dataset and the feature grouping steps are repeated for datasets associated with entities of different industry types for creating a taxonomy for each of the different industry types, and wherein the inference engine comprises a labelling unit in communication with the processor and configured to:

assign the element to each sentence of a first dataset fetched from a data storage based on cognitive analysis capability developed by the system using pre-existing dataset associated with entities of different industry types collected over a period of time; and update pre-existing data with content of the first dataset and the new dataset.

7. The system of claim 6, wherein the labeling unit is configured to assign the element to each sentence of the new dataset based on the generated metadata.

8. The system of claim 6, wherein the predetermined elements are pre-configured in the labelling unit, the predetermined elements comprising at least one member selected from the group comprising of: service or product quality label, social responsibility label, employee friendliness label, technology advancement label, and financial condition label.

9. The system of claim 6, wherein the inference engine comprises a feature grouping unit in communication with the processor and configured to categorize features of the first dataset into one or more groups, the features being determined from each sentence of the first dataset.

10. The system of claim 6, wherein the inference engine comprises a classification unit in communication with the processor and configured to:

create the one or more classification rules for allotting the groups to the matched features; and generate metadata representing instructions for assigning an element to each sentence of the new dataset based on the groups allotted to the matched features.

11. The system of claim 10, wherein the labeling unit is configured to assign the element to each sentence of the new dataset based on the generated metadata.

12. The system of claim 6, wherein the inference engine comprises a sentiment identifier in communication with the processor and configured to:
    analyze the elements assigned to the first and the new dataset to identify a sentiment associated with the said entities of the said industry type as representing a positive sentiment or a negative sentiment, and generates the reputation score for each of the said entities by computing a percentage of sentences in the first and the new dataset representing a positive and a negative sentiment.

13. The system of claim 6, wherein the system is a tool hosted in a cloud computing architecture and delivered to users as Software as a Service (SAAS) over a communication network.

14. The system of claim 6, wherein the predetermined elements are pre-configured in the labelling unit, the predetermined elements comprising at least one member selected from the group comprising of: service or product quality label, social responsibility label, employee friendliness label, technology advancement label, and financial condition label.

15. The system of claim 6, further comprising a repository for storing the grouped features, thereby maintaining a taxonomy for different industry types.

16. The system of claim 10, wherein the classification unit operates in conjunction with the repository for matching features of the new dataset with the grouped features of the first dataset.

17. The system of claim 15, wherein the classification unit operates in conjunction with the repository for matching features of the new dataset with the grouped features of the first dataset.

18. The system of claim 12, wherein the sentiment identifier identifies sentences in the first and the new dataset as a positive sentiment or a negative sentiment by matching words in the sentences with words stored in a dictionary identified as positive or negative, and generates the reputation score.

19. A computer program product comprising:
    a non-transitory computer-readable medium having computer-readable program code stored thereon, the computer-readable program code comprising instructions that, when executed by a processor, cause the processor to:
    a. assign an element to each sentence of a first dataset fetched from a data storage, the sentence associated with an entity of an industry type, the element being assigned to each sentence from a set of predetermined elements, the predetermined elements being characteristic of reputation of entities of various industries, wherein the element is assigned to each sentence of the first dataset based on cognitive analysis capability developed by the tool using pre-existing dataset associated with entities of different industry types collected over a period of time;
    b. categorize features of the first dataset into one or more groups, wherein each group represents related features corresponding to each assigned element;
    c. match the features of the new dataset of a different entity of the said industry type with the grouped features of the said industry type to allot groups to the matched features similar to the groups of the grouped features;
    d. apply one or more classification rules on the new dataset to the matched features to generate metadata representing instructions for assigning an element to each sentence of the new dataset, wherein the one or more classification rules are created based on the assigned elements and the grouped features;
    e. generate metadata representing instructions for assigning an element to each sentence of the new dataset of the different entity of the said industry type based on the grouping of the matched features;
    f. assign an element to each sentence of the new dataset based on the metadata, wherein the element assigned to each sentence of the new dataset of the different entity of the said industry type is same as the element assigned to each sentence of the first dataset of the said entity of the said industry type;
    g. analyze the elements assigned to the first dataset and the new dataset to identify a sentiment associated with the said entities of the said industry type, wherein the sentiment is identified by determining sentences from the first and the new dataset as representing a positive sentiment or a negative sentiment; and
    h. generate a reputation score for the said entities based on the identified sentiments,
    wherein steps a and b are repeated for datasets associated with entities of different industry types for creating a taxonomy for each of the different industry types, and
    wherein the pre-existing data in the tool is undated with content of the first dataset and the new dataset.

* * * * *